(12) United States Patent
Karlin (10) Patent No.: US 11,605,249 B2
(45) Date of Patent: Mar. 14, 2023

(54) USING AUTOMATIC ROAD HAZARD DETECTION TO CATEGORIZE AUTOMOBILE COLLISION

(71) Applicant: DISH Wireless L.L.C., Englewood, CO (US)

(72) Inventor: Kevin Lee Karlin, Highlands Ranch, CO (US)

(73) Assignee: DISH Wireless L.L.C., Englewood, CO (US)

( * ) Notice: Subject to any disclaimer, the term of this patent is extended or adjusted under 35 U.S.C. 154(b) by 239 days.

(21) Appl. No.: 17/019,832

(22) Filed: Sep. 14, 2020

(65) Prior Publication Data

US 2022/0084323 A1    Mar. 17, 2022

(51) Int. Cl.
*G07C 5/00* (2006.01)
*G06Q 40/08* (2012.01)
*G07C 5/08* (2006.01)

(52) U.S. Cl.
CPC ............ *G07C 5/008* (2013.01); *G06Q 40/08* (2013.01); *G07C 5/0808* (2013.01); *G07C 5/0841* (2013.01)

(58) Field of Classification Search
CPC .... G07C 5/008; G07C 5/0808; G07C 5/0841; G06Q 40/08
See application file for complete search history.

(56) References Cited

U.S. PATENT DOCUMENTS

| 9,151,633 B2 | 10/2015 | Hoffberg |
| 9,384,597 B2 | 7/2016 | Koch et al. |
| 10,133,530 B2 | 11/2018 | Wasserman |
| 10,331,141 B2 | 6/2019 | Grimm et al. |
| 10,403,150 B1 * | 9/2019 | Nepomuceno ......... G08G 1/205 |
| 10,471,958 B2 | 11/2019 | Remillard et al. |
| 10,482,770 B2 | 11/2019 | Anderson et al. |
| 10,513,161 B2 | 12/2019 | Anderson et al. |
| 10,533,870 B1 | 1/2020 | Slusar |
| 2004/0107042 A1 | 6/2004 | Seick |
| 2012/0316772 A1 | 12/2012 | Han et al. |

(Continued)

FOREIGN PATENT DOCUMENTS

WO    2014/186359 A1    11/2014

OTHER PUBLICATIONS

Balakuntala et al., "An Intelligent System to Detect, Avoid and Maintain Potholes: A Graph Theoretic Approach," arXiv.org, arXiv:1305,5522v3, Sep. 18, 2013, 5 pages.

(Continued)

*Primary Examiner* — Sizo B Vilakazi
(74) *Attorney, Agent, or Firm* — Jeremiah J. Baunach; VLP Law Group LLP (57) ABSTRACT

A facility for categorizing a collision of an automobile is described. The facility receives a collision indication from a driver of the automobile, and determines a time and location of the collision based on the collision indication. The facility receives sensor data originated by one or more cars each at a location near the collision location at a time near the collision time, and analyzes the received sensor data to recognize one or more road hazards represented in the (Continued)

sensor data. The facility determines a probability that collision was with a recognized road hazard, and attributes a collision category to the collision based upon the determined probability.

21 Claims, 7 Drawing Sheets

(56) References Cited

U.S. PATENT DOCUMENTS

2018/0154723 A1 6/2018 Anderson et al.
2018/0286246 A1* 10/2018 Baca ................ G08G 1/162

OTHER PUBLICATIONS

IP.com, "Real Time Route Update in Navigation Systems using Vehicle and Driver Data," IPCOM000181701D, IP.com, Apr. 9, 2009, 4 pages.
IP.com, "Interactive Road Condition Detection and Reporting," IPCOM000209509D, IP.com, Aug. 8, 2011, 3 pages.
IP.com, "Accident Avoidance through Risk Management," IPCOM000224782D, IP.com, Jan. 3, 2013, 5 pages.
IP.com, "Automatic Potholes Detection based on Individual Driving Behavior Patterns with Continuous Reverification and Ranking," IPCOM000231473D, IP.com, Oct. 1, 2013, 7 pages.
IP.com, "Method and System for Automatically Suggesting Alternate Safer Routes," IPCOM000246425D, IP.com, Jun. 6, 2016, 4 pages.
IP.com, "Turn-by-Turn Navigation System based on Vehicle Features, Real-Time Road Condition and Co-Passenger Profile," IPCOM000252584D, IP.com, Jan. 29, 2018, 4 pages.
IP.com, "Method and System for Predicting Vehicle Insurance Cost Based on Predicted Damage in the Vehicle," IPCOM000257168D, IP.com, Jan. 17, 2019, 4 pages.
IP.com, "System for Prioritization of Road Repairs Using Autonomous Vehicles," IPCOM000260925D, IP.com, Jan. 8, 2020, 4 pages.
IP.com, "Smart Reporting of Road Defects," IPCOM000261950D, IP.com, Apr. 20, 2020, 7 pages.
Stone, S., "Connected, Autonomous Cars: Passive Pothole Patrollers," IEEE Potentials, Jan. /Feb. 2020, pp. 52-58.
Venkatesh et al., "An Intelligent System to Detect, Avoid and Maintain Potholes: A Graph Theoretic Approach," 2014 Seventh International Conference on Mobile Computing and Ubiquitous Networking (ICMU), IEEE, 2014, p. 80.

* cited by examiner

USING AUTOMATIC ROAD HAZARD DETECTION TO CATEGORIZE AUTOMOBILE COLLISION

BACKGROUND

Automobiles can be damaged when they collide with objects, including other cars, curbs, buildings, guardrails, and road hazards such as potholes, broken roads, debris in the road, etc.

DETAILED DESCRIPTION

The inventor has recognized that, as part of allocating responsibility for automobile damage that results from automobile collisions, it can be useful to categorize those collisions. In particular, it can be useful to assess whether damage likely resulted from colliding with a road hazard, for which a driver may be judged to have a lower level of responsibility than collisions of other types.

In response to this recognition, the inventor has conceived and reduced to practice a software and/or hardware facility for automatically categorizing a subject automobile's collision based upon automatically detecting road hazards along the automobile's path ("the facility").

In some embodiments, when a collision occurs, the driver provides user input indicating that a collision has occurred. This collision indication can be provided contemporaneously with the collision, or at a later time. Based on the collision indication, the facility determines the time and location at which the collision occurred.

The facility automatically assesses the likelihood that the indicated collision involved a road hazard. In a variety of embodiments, the facility uses information about road hazards automatically collected by the subject automobile; cars that were nearby the location of the collision at the time of the collision; and cars that passed the location of the collision at times shortly before or after the time of the collision. These cars collect this information via such sensors as cameras, ultrasonic sensors, radar sensors, LIDAR sensors, shock sensors, and attitude sensors. The facility recognizes road hazards in the collected data, and determines the likelihood that the indicated collision involved a road hazard by comparing the times and locations at which the data shows road hazards with the time and location of the indicated collision In some embodiments, the facility uses the collected data to determine the number of road hazards that occurred during a particular period of time in a particular geographic area, such as a county, as a basis for determining how likely an automobile is to collide with a road hazard in that geographic area.

By performing in some or all of the ways discussed above, the facility provides more reliable categorization of automobile collisions than is presently possible.

Also, the facility improves the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with less latency, and/or preserving more of the conserved resources for use in performing other tasks or additional instances of the same task.

Figure 1:
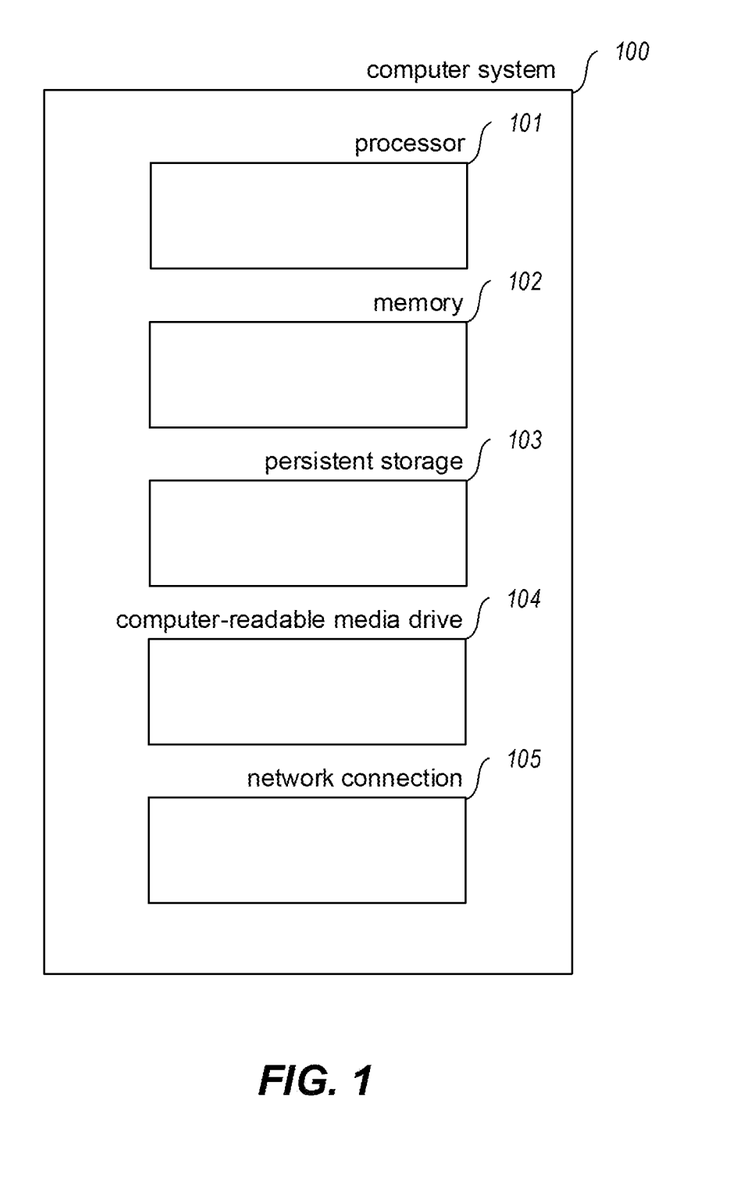
FIG. 1 is a block diagram showing some of the components typically incorporated in at least some of the computer systems and other devices on which the facility operates.

FIG. 1 is a block diagram showing some of the components typically incorporated in at least some of the computer systems and other devices on which the facility operates. In various embodiments, these computer systems and other devices 100 can include server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a processor 101 for executing computer programs and/or training or applying machine learning models, such as a CPU, GPU, TPU, NNP, FPGA, or ASIC; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 2:
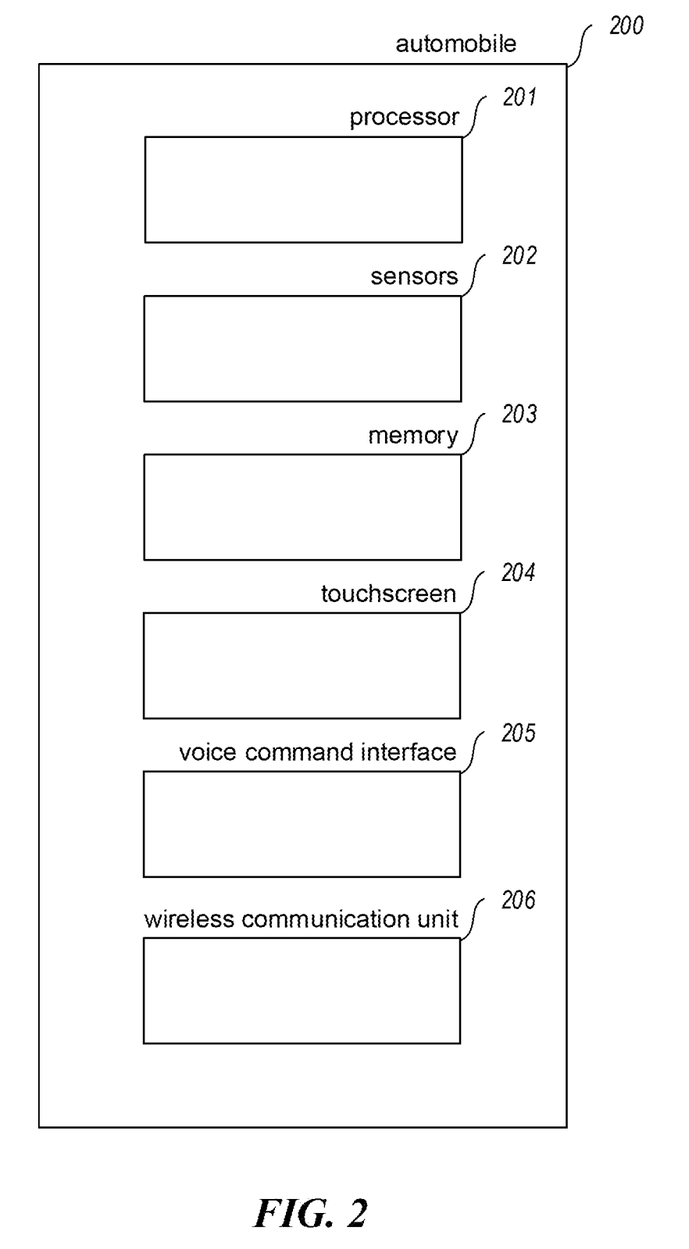
FIG. 2 is a block diagram showing some of the components typically incorporated in at least some of the automobiles on which the facility operates.

FIG. 2 is a block diagram showing some of the components typically incorporated in at least some of the automobiles on which the facility operates. In various embodiments, these automobiles zero or more of each of the following: a processor 201 for executing computer programs and/or or training or applying machine warning models, such as a CPU, GPU, TPU, NNP, FPGA, or ASIC; sensors for detecting a condition of vehicle, including image sensors, radar sensors, lidar sensors, ultrasounding sensors, accelerometers or other shock sensors, attitude sensors, tire pressure sensors, suspension position, travel, compression sensors, or GPS or other positioning system sensor, etc.; a computer memory 203 for storing programs and data while they are being used, including the facility and associated data, an operating system including a kernel, and device drivers; a touchscreen 204 on which the automobile can display visual information and receive interactions, such as single or multi-point touches; a voice command interface 205 for receiving and processing voice commands, such as one that uses in-cabin microphones, activation buttons, activation phrases, etc.; and a wireless communication unit 206 for communicating data between the automobile and other external devices, such as a cellular communications unit.

While automobiles configured as described above are typically used to support the operation of the facility, those skilled in the art that the facility may be implemented using devices of various types and configurations and having various components.

Figure 3:
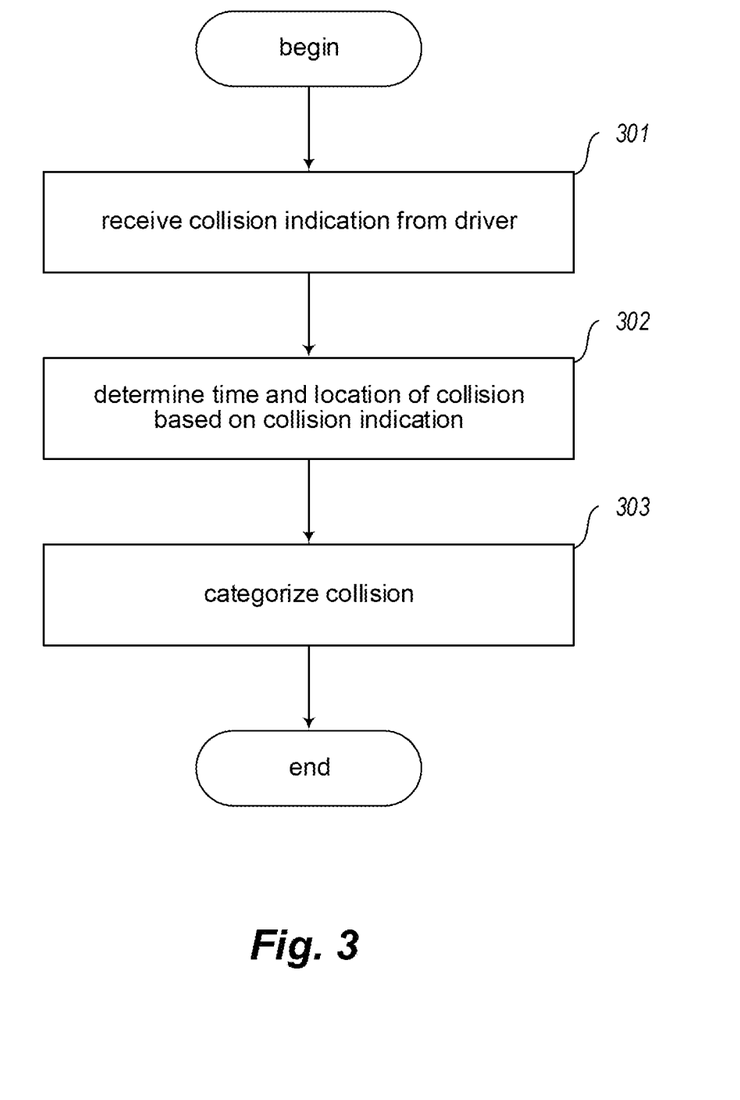
FIG. 3 is a flow diagram showing a process performed by the facility in some embodiments to receive and process a collision indication.

FIG. 3 is a flow diagram showing a process performed by the facility in some embodiments to receive and process a collision indication. In act 301, the facility receives a collision indication from the driver. In act 302, the facility determines a time and location of the collision based upon the collision indication received in act 301. In act 303, the facility categorizes the collision. Act 303 is discussed in more detail below in connection with FIG. 6. After act 303, this process concludes.

Those skilled in the art will appreciate that the acts shown in FIG. 3 and in each of the flow diagrams discussed below may be offered in a variety of ways. For example, the order of the acts may be rearranged; acts may be performed in parallel; shown acts may be omitted, or other acts may be included; a shown act may be divided into sub acts, or multiple shown acts may be combined into a single act; etc.

Figure 4:
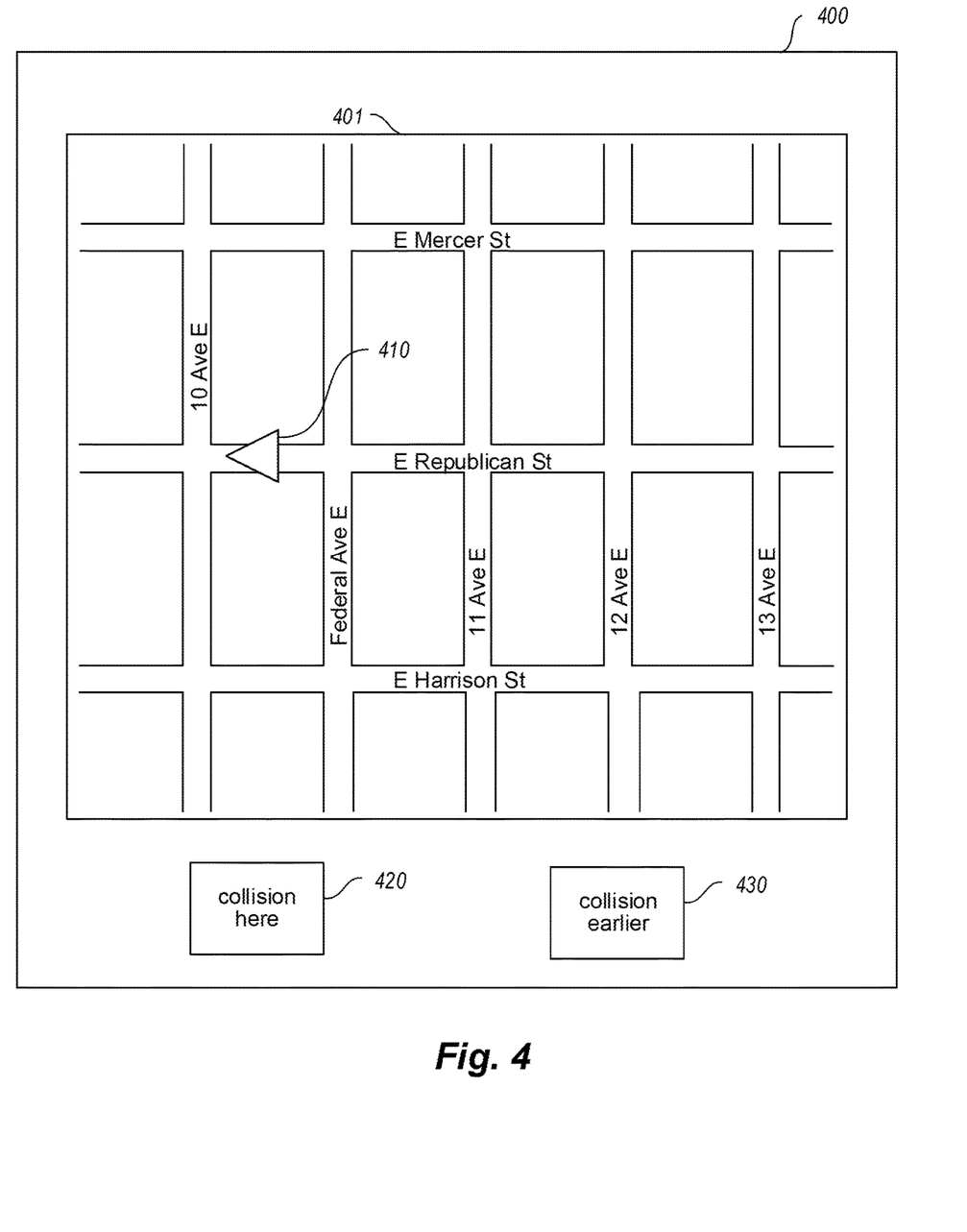
FIG. 4 is a display diagram showing a first display presented by the facility in some embodiments to receive a collision indication from the driver.
Figure 5:
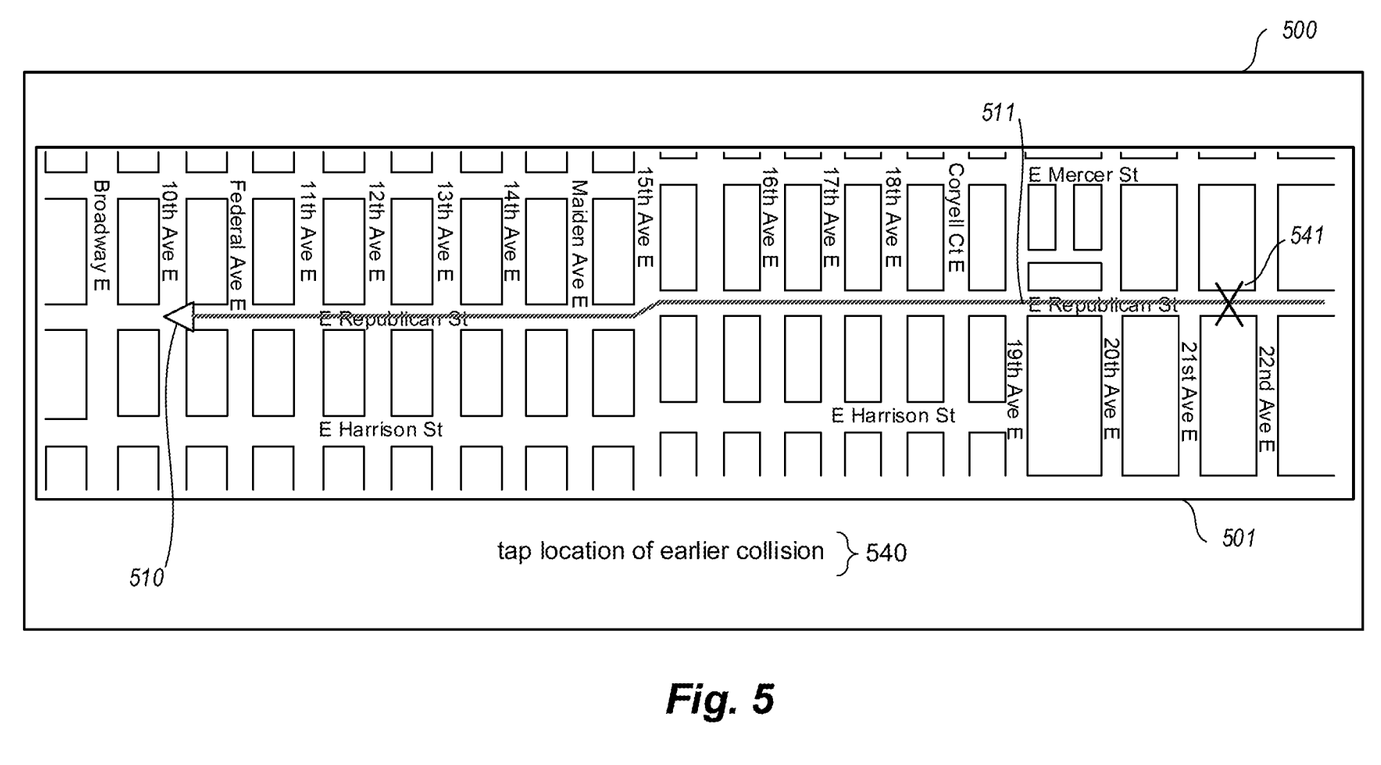
FIG. 5 is a display diagram showing a sample display presented by the facility in some embodiments to permit the driver to select a location at which an earlier collision occurred.

FIGS. 4 and 5 show examples of the process described in FIG. 3. FIG. 4 is a display diagram showing a first display presented by the facility in some embodiments to receive a collision indication from the driver. In various embodiments, the facility presents this display 400 on a display integrated into the automobile—such as a dashboard touchscreen display—or a display carried into the automobile by a driver or a passenger, such as the display of a smartphone, tablet computer, laptop computer, smart watch, etc. The display includes a map 401 showing the streets near the vehicle. On the map, the vehicle is represented a vehicle indicator 410 that shows the position of the automobile—on East Republican Street, between 10th Avenue East and Federal Avenue East—in the direction of travel—toward the west, which is the left side of the map. The display further includes a collision here button 420 and a collision earlier button 430. The user can activate the collision here button 420, such as by touching the screen within its border, in order to indicate that the automobile has collided at the present location. In various embodiments, the facility permits the driver to activate the collision here button and other buttons described below in a variety of other ways, including using voice commands. If the user activates the collision here button, the facility uses the time of activation as the collision time and the location of the automobile at the time of activation as the collision location.

The display also includes a collision earlier button 430. If the user activates the collision earlier button, the facility permits the user to identify an earlier time or location at which the collision occurred, and uses the one identified by the user to automatically determine the other.

FIG. 5 is a display diagram showing a sample display presented by the facility in some embodiments to permit the driver to select a location at which an earlier collision occurred. The display 500 includes a map 501. The map is augmented to include both the vehicle indication 510 and a path 511 taken by the automobile to its current location. The facility displays a prompt 540 asking the user to tap a location along the path where the earlier collision occurred. When the driver does this at location 541, the facility marks this location with an "X." Based upon stored time-indexed location data corresponding to the automobile's path, the facility determines or estimates the time at which the vehicle passed through the selected location 541 to use as the collision time. In some embodiments, the user may similarly enter a time at which the collision occurred (not shown), from which the facility determines or estimates the location at which the location occurred.

Figure 6:
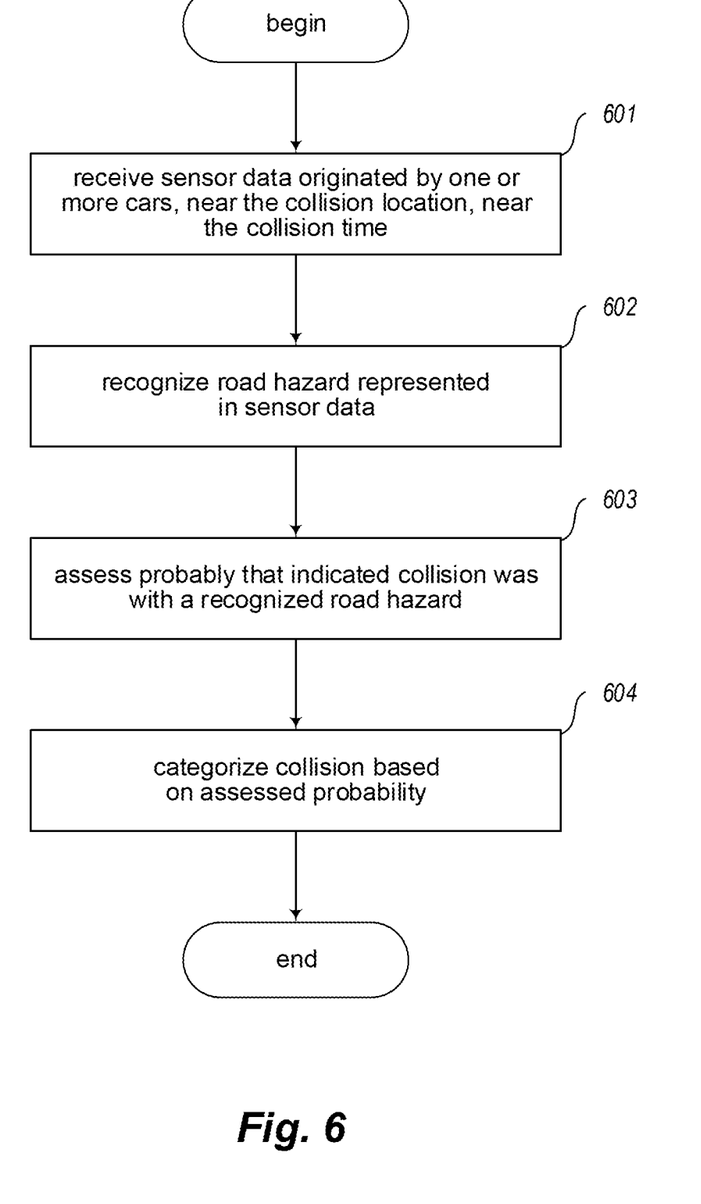
FIG. 6 is a flow diagram showing a process performed by the facility in some embodiments to categorize a collision whose time and location have been indicated by the driver.

FIG. 6 is a flow diagram showing a process performed by the facility in some embodiments to categorize a collision whose time and location have been indicated by the driver. In act 601, the facility receives sensor data originated by one or more cars near the collision location and near the collision time. In various embodiments, the cars originating the received sensor data are the subject automobile that had the collision, cars other than the automobile that had the collision, or both. In various embodiments, some of the received sensor data is originated by cars that are within different distances of the collision location, such as 1 meter, 10 meters, 25 meters, 50 meters, or 100 meters. In various embodiments, the received sensor data is originated by cars within different amounts of the time of the collision time, such as 1 second, 5 seconds, 10 seconds, 30 seconds, 1 minute, 5 minutes, 20 minutes, 1 hour, 1 day, or 1 week. In various embodiments, various types of sensor data that may reflect the presence of or collision with a road hazard are received, such as camera images, lidar point clouds, radar output, or ultrasonic output showing the road hazard; or shock sensors, attitude sensors, or suspension sensors reflecting the effects on the automobile of striking the road hazard. In act 602, the facility recognizes in the sensor data received in act 601 one or more road hazards.

In various embodiments, the facility performs collection, transmission, and storage of sensor data and recognition in it of road hazards in acts 601 and 602 using approaches described in one or more of the following documents, each of which is hereby incorporated by reference in its entirety: International Publication No. WO2014186359 A1, filed May 13, 2014; U.S. Publication No. 2018/0154723, published Jun. 7, 2018; U.S. Publication No. 2004/0107042, published Jun. 3, 2004; U.S. Publication No. 2018/0286246, published Oct. 4, 2018; U.S. Pat. No. 9,384,597, granted Jul. 5, 2016; U.S. Pat. No. 10,482,770, granted Nov. 19, 2019; U.S. Pat. No. 10,331,141, granted Jun. 25, 2019; U.S. Pat. No. 10,403,150, granted Sep. 3, 2019; Non-patent document "Smart Reporting of Road Defects," IPCOM000261950D, IP.com, Apr. 20, 2020; Non-patent Document Balakuntala et al., "An Intelligent System to Detect, Avoid and Maintain Potholes: A Graph Theoretic Approach," arXiv.org, arXiv: 1305.5522v3, Sep. 18, 2013; Non-patent document Stone, Samuel, "Connected, Autonomous Cars: Passive Pothole Patrollers," IEEE Potentials 39.1 (2020): 52-58, IEEE, 2020; Non-patent document "Turn-by-Turn Navigation System based on Vehicle Features, Real-Time Road Condition and Co-Passenger Profile," IPCOM000252584D, IP.com, Jan. 29, 2018; Non-patent document Venkatesh et al., "An Intelligent System to Detect, Avoid and Maintain Potholes: A Graph Theoretic Approach," 2014 Seventh International Conference on Mobile Computing and Ubiquitous Networking (ICMU), IEEE, 2014; Non-patent document "Automatic Potholes Detection based on Individual Driving Behavior Patterns with Continuous Reverification and Ranking," IPCOM000231473D, IP.com, Oct. 1, 2013; Non-patent document "Interactive Road Condition Detection and Reporting," IPCOM000209509D, IP.com, Aug. 8, 2011; and Non-patent document "System for Prioritization of Road Repairs Using Autonomous Vehicles," IPCOM000260925D, IP.com, Jan. 8, 2020 are incorporated herein by reference, in their entirety. In cases where the present application conflicts with a document incorporated by reference, the present application controls.

In act 603, the facility assesses the probability that the indicated collision was with a road hazard recognized in act 602. In various embodiments, the facility assesses this probability in a manner that is inversely related to the distance separating the recognized location from the collision location, and inversely related to the amount of time separating the recognized road hazards from the collision time. In various embodiments, the facility considers various other factors, such as the size and nature of the road hazard, the number of separate observations of the road hazard that occur in the sensor data, the number, type, condition, and/or resolution of the sensors involved in originating the data from which the road hazard was recognized, etc.

In act 604, the facility categorizes the collision based upon the probability assessed in act 603. In some embodiments, the facility performs step 604 by comparing the probability determined in act 603 to a probability threshold. In various embodiments, the facility sets this probability threshold empirically or editorially. In some embodiments, the facility goes on to use the categorization produced in act 604 to allocate responsibility for the collision and/or to approve or deny a claim for automobile damage that a claimant has asserted to have resulted from the collision. After act 604, this process concludes.

Figure 7:
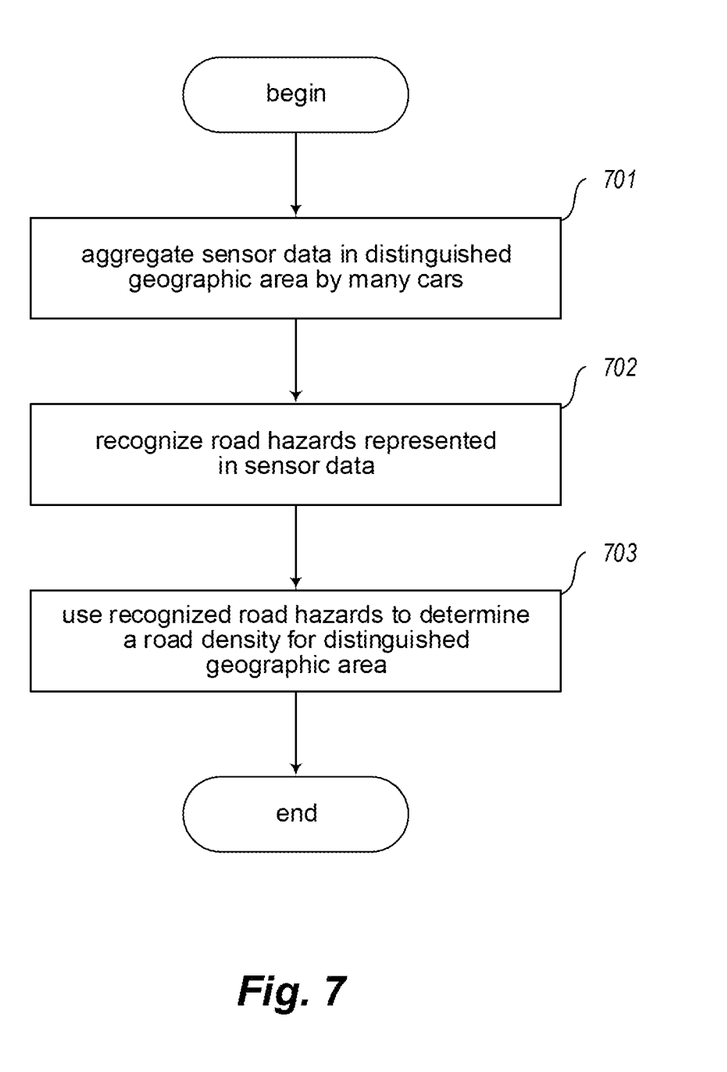
FIG. 7 is a flow diagram showing a process performed by the facility in some embodiments to assess the frequency or density of road hazards in a particular geographic area.

FIG. 7 is a flow diagram showing a process performed by the facility in some embodiments to assess the frequency or density of road hazards in a particular geographic area. In act 701, the facility aggregates sensor data, such as the sensor data discussed above in connection with step at 601, in the geographic area being analyzed during the time period being analyzed by many cars. In act 702, the facility recognizes road hazards represented in the sensor data aggregated in act 702, in a manner similar to that described above in connection with act 602. In act 703, the facility uses the road hazards recognized in act 702 to determine a road hazard density or frequency metric for the distinguished geographic area. In some embodiments, the facility performs act 703 by counting the number of recognized hazards, and/or aggregating the amounts of time for which each hazard was present, and dividing by one or more factors such as total number of miles of road in the geographic region, total number of miles of road lanes in the geographic region, or total number of miles driven by all cars in the geographic region during the evaluation period. In some embodiments, the facility uses the metric determined in act 703 to set a premium level for collision coverage for automobiles that are typically operated in the geographic area. After act 703, this process concludes.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. One or more computer memories collectively having contents configured to cause a computing system to perform a method for categorizing a collision of an automobile, the method comprising:
  receiving a collision indication from a driver of the automobile;
  determining a time and location of the collision based on the collision indication;
  receiving sensor data originated by one or more cars each at a location near the collision location at a time near the collision time;
  analyzing the received sensor data to recognize one or more road hazards represented in the sensor data;
  determining a probability that collision was with a recognized road hazard; and
  attributing a collision category to the collision based upon the determined probability.

2. The one or more computer memories of claim 1 wherein the received sensor data is originated from images sensors, radar sensors, ultrasonic sensors, accelerometers, orientation sensors, microphones, tire pressure sensors, or suspension compression sensors borne by the one or more cars.

3. The one or more computer memories of claim 1 wherein the one or more cars comprise the automobile.

4. The one or more computer memories of claim 1 wherein the one or more cars comprise a plurality of cars other than the automobile.

5. The one or more computer memories of claim 1 wherein the analyzing is performed only with respect to sensor data originated within 5 seconds of the collision time.

6. The one or more computer memories of claim 1 wherein the analyzing is performed only with respect to sensor data originated within one minute of the collision time.

7. The one or more computer memories of claim 1 wherein the analyzing is performed only with respect to sensor data originated within one day of the collision time.

8. The one or more computer memories of claim 1 wherein the analyzing is performed only with respect to sensor data originated within one meter of the collision location.

9. The one or more computer memories of claim 1 wherein the analyzing is performed only with respect to sensor data originated within fifty meters of the collision location.

10. The one or more computer memories of claim 1 wherein determining a time and location of the collision based on the collision indication comprises:
  determining the time of the collision to be a time at which the collision indication was received from the driver; and
  determining the location of the collision to be a location of the automobile when the collision indication was received from the driver.

11. The one or more computer memories of claim 1, the method further comprising:
in response to receiving the collision indication:
presenting to the driver a map visually identified a path taken by the automobile to it location at the time the collision indication was received; and
receiving user input selecting a location along the visual identification of the path,
and wherein determining a time and location of the collision based on the collision indication comprises:
determining the location of the collision to be the selected location; and
determining the time of the collision to be a time at which the automobile was at the selected location.

12. The one or more computer memories of claim 1 wherein the collision indication is received from the driver via a smartphone.

13. The one or more computer memories of claim 1 wherein the collision indication is received from the driver via a voice command interface of the automobile.

14. The one or more computer memories of claim 1 wherein the collision indication is received from the driver via a touchscreen of the automobile.

15. The one or more computer memories of claim 1, the method further comprising allocating responsibility for the collision based on the collision category attributed to the collision.

16. The one or more computer memories of claim 1, the method further comprising determining whether to approve a claim for automobile damage asserted to have resulted from the collision based on the collision category attributed to the collision.

17. A method in a computing system for evaluating roads in a geographic area, the method comprising:
for each of a plurality of automobiles, receiving sensor data originated by the automobile in the geographic area during an evaluation period;
analyzing the received sensor data to recognize road hazards represented in the sensor data; and
determining a metric for the roads in the geographic area based on the recognized road hazards.

18. The method of claim 17 wherein the metric is determined relative to one of the following: total number of miles of road in the geographic region, total number of miles of road lanes in the geographic region, or total number of miles driven by all cars in the geographic region during the evaluation period.

19. The method of claim 17, further comprising setting a premium level for collision coverage for an automobile typically operated in the geographic area based at least in part on the determined metric.

20. The method of claim 17, further comprising setting a premium level for liability coverage for a government entity in the geographic area based at least in part on the determined metric.

21. One or more computer memories collectively storing a collision categorization data structure, the data structure comprising, for each of one or more automobile collisions:
information indicating a category assigned to the automobile collision, by:
receiving a collision indication from a driver of the automobile;
determining a time and location of the collision based on the collision indication;
receiving sensor data originated by one or more cars each at a location near the collision location at a time near the collision time;
analyzing the received sensor data to recognize one or more road hazards represented in the sensor data;
determining a probability that collision was with a recognized road hazard; and
assigning a collision category to the collision based upon the determined probability,
such that, for particular automobile collision, the contents of the data structure can be accessed to determine the collision category assigned to the automobile collision.

* * * * *